(12) United States Patent
Raza et al.

(10) Patent No.: US 11,375,297 B2
(45) Date of Patent: *Jun. 28, 2022

(54) INTELLIGENT FIBER PORT MANAGEMENT

(71) Applicant: Fiber Mountain, Inc., Cheshire, CT (US)

(72) Inventors: Mohammad H. Raza, San Jose, CA (US); David G Stone, Irvine, CA (US); Aristito Lorenzo, Plantsville, CT (US); Phuc Minh Ly, Waterbury, CT (US)

(73) Assignee: FIBER MOUNTAIN, INC., Cheshire, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/889,616

(22) Filed: Jun. 1, 2020

(65) Prior Publication Data

US 2020/0296482 A1 Sep. 17, 2020

Related U.S. Application Data

(63) Continuation of application No. 16/288,389, filed on Feb. 28, 2019, now Pat. No. 10,674,235, which is a
(Continued)

(51) Int. Cl.
*G08B 21/00* (2006.01)
*H04Q 1/14* (2006.01)
(Continued)

(52) U.S. Cl.
CPC ........... *H04Q 1/148* (2013.01); *G02B 6/3885* (2013.01); *G02B 6/3897* (2013.01); *G02B 6/428* (2013.01);
(Continued)

(58) Field of Classification Search
CPC .... H04Q 1/148; H04Q 2201/804; H04Q 1/13; G02B 6/428; G02B 6/3885;
(Continued)

(56) References Cited

U.S. PATENT DOCUMENTS

| | | |
|---|---|---|
| 5,101,151 A | 3/1992 | Beaufils et al. |
| 5,457,556 A | 10/1995 | Shiragaki |

(Continued)

FOREIGN PATENT DOCUMENTS

| | | |
|---|---|---|
| EP | 2468008 | 6/2012 |
| GB | 2414347 | 11/2005 |

(Continued)

OTHER PUBLICATIONS

LHCB Online System Data Acquisition & Experiment Control. 2001. (retrieved on Sep. 4, 2015). Retrieved from the internet: <URL:http://lhcb-comp.web.cern.ch/ilcb-comp/General/Publicaitons/onlinetdr.pdf>.

(Continued)

*Primary Examiner* — Anh V La
(74) *Attorney, Agent, or Firm* — Wissing Miller LLP

(57) ABSTRACT

A fiber port management system that can be connected between network devices and network appliances is provided. The fiber port management system includes a housing, one or more hydra cables within the housing, one or more indicators and a controller. The housing has a front panel with a plurality of low density fiber connectors and a rear panel with a plurality of high density fiber connectors. The hydra cable is positioned within the housing and connects one of the plurality of high density fiber connectors to two or more of the plurality of low density fiber connectors. The one or more indicators are associated with each of the plurality of low density fiber connectors and each of the plurality of high density fiber connectors. The controller is located within the housing and is used to control the operation of the indicators.

15 Claims, 9 Drawing Sheets

Related U.S. Application Data continuation of application No. 15/705,084, filed on Sep. 14, 2017, now Pat. No. 10,225,628.

(60) Provisional application No. 62/394,544, filed on Sep. 14, 2016.

(51) Int. Cl.
  *G02B 6/44* (2006.01)
  *G08B 5/36* (2006.01)
  *G02B 6/38* (2006.01)
  *G02B 6/42* (2006.01)

(52) U.S. Cl.
  CPC ......... *G02B 6/4246* (2013.01); *G02B 6/4292* (2013.01); *G02B 6/4452* (2013.01); *G02B 6/4472* (2013.01); *G08B 5/36* (2013.01); *G02B 6/3879* (2013.01); *H04Q 2201/804* (2013.01)

(58) Field of Classification Search
  CPC .. G02B 6/4246; G02B 6/4292; G02B 6/4472; G02B 6/4452; G02B 6/3897; G02B 6/3879; G02B 6/3895; G08B 5/36
  USPC ......... 340/687, 653, 815.45, 686.1; 385/135, 385/134, 137, 138, 139
  See application file for complete search history.

(56) References Cited

U.S. PATENT DOCUMENTS

| | | | |
|---|---|---|---|
| 5,493,565 A | 2/1996 | Hanson et al. | |
| 5,838,681 A | 11/1998 | Bonomi et al. | |
| 5,892,770 A | 4/1999 | Wolf et al. | |
| 6,188,702 B1 | 2/2001 | Tornetta et al. | |
| 6,243,510 B1 | 6/2001 | Rauch | |
| 6,765,877 B1 | 7/2004 | Foschiano | |
| 6,747,878 B1 | 8/2004 | Hipp et al. | |
| 6,980,725 B1 | 12/2005 | Swieconek | |
| 7,226,217 B1 | 6/2007 | Benton et al. | |
| 7,277,425 B1 | 10/2007 | Sikdar | |
| 7,492,714 B1 | 2/2009 | Liao et al. | |
| 7,606,494 B1 | 10/2009 | Weston-Dawkes | |
| 7,653,057 B1 | 2/2010 | Fromm | |
| 7,772,975 B2 | 8/2010 | Downie et al. | |
| 7,782,202 B2 | 8/2010 | Downie et al. | |
| 7,831,733 B2 | 11/2010 | Sultan | |
| 7,965,186 B2 | 6/2011 | Downie et al. | |
| 8,138,925 B2 | 3/2012 | Downie et al. | |
| 8,264,366 B2 | 9/2012 | Chamarti et al. | |
| 8,421,626 B2 | 4/2013 | Downie et al. | |
| 8,576,839 B2 | 11/2013 | Beshai | |
| 8,873,967 B2 | 10/2014 | Bames | |
| 8,994,547 B2 | 3/2015 | German | |
| 9,002,170 B2 | 4/2015 | Neitge et al. | |
| 9,030,947 B2 | 5/2015 | Xu | |
| 9,100,313 B1 | 8/2015 | Mazzola | |
| 9,159,012 B2 | 10/2015 | Downie et al. | |
| 9,172,465 B2 | 10/2015 | Wu | |
| 9,277,302 B2 | 3/2016 | Beshai | |
| 9,715,795 B2 | 7/2017 | Butterbaugh | |
| 9,865,976 B2 | 1/2018 | Warren | |
| 10,225,628 B2 | 3/2019 | Raza et al. | |
| 10,674,235 B2 * | 6/2020 | Raza ................ | G02B 6/428 |
| 2001/0015839 A1 | 8/2001 | Koh et al. | |
| 2003/0026205 A1 | 2/2003 | Mullendore et al. | |
| 2003/0030866 A1 | 2/2003 | Yoo | |
| 2004/0029417 A1 | 2/2004 | Engel et al. | |
| 2004/0160917 A1 | 8/2004 | Eliznd | |
| 2006/0018329 A1 | 1/2006 | Nielsen et al. | |
| 2006/0148279 A1 | 7/2006 | German et al. | |
| 2006/0165366 A1 | 7/2006 | Feustel et al. | |
| 2006/0186926 A1 | 8/2006 | Yager et al. | |
| 2006/0251419 A1 | 11/2006 | Zadikian et al. | |
| 2007/0291535 A1 | 12/2007 | Eberle et al. | |
| 2008/0101229 A1 | 5/2008 | Meleis et al. | |
| 2009/0051558 A1 | 2/2009 | Dorval | |
| 2009/0074414 A1 | 3/2009 | Miles et al. | |
| 2009/0226181 A1 | 9/2009 | Fingler et al. | |
| 2010/0098412 A1 | 4/2010 | Boyd et al. | |
| 2010/0211664 A1 | 4/2010 | Raza et al. | |
| 2010/0129078 A1 | 5/2010 | Weston-Dawkes et al. | |
| 2010/0142544 A1 | 6/2010 | Chapel et al. | |
| 2010/0211665 A1 | 8/2010 | Raza et al. | |
| 2010/0211697 A1 | 8/2010 | Raza et al. | |
| 2010/0215049 A1 | 8/2010 | Raza et al. | |
| 2010/0266117 A1 | 10/2010 | Enge et al. | |
| 2011/0092100 A1 | 4/2011 | Coffrey et al. | |
| 2011/0116748 A1 | 5/2011 | Smrha et al. | |
| 2011/0188383 A1 | 8/2011 | Koziy et al. | |
| 2011/0228473 A1 | 9/2011 | Anderson et al. | |
| 2011/0255829 A1 | 10/2011 | Anderson et al. | |
| 2011/0274437 A1 | 11/2011 | Jones et al. | |
| 2011/0292788 A1 | 12/2011 | Tsuchiya | |
| 2012/0008945 A1 | 1/2012 | Single et al. | |
| 2012/0069839 A1 | 3/2012 | Kunz et al. | |
| 2012/0102217 A1 | 4/2012 | Carona | |
| 2012/0219005 A1 | 8/2012 | Durve et al. | |
| 2012/0243554 A1 | 9/2012 | Sybesma et al. | |
| 2012/0246362 A1 | 9/2012 | Anne et al. | |
| 2012/0287939 A1 | 11/2012 | Leu | |
| 2013/0148976 A1 | 6/2013 | Patel et al. | |
| 2013/0171042 A1 | 7/2013 | Plotnikov et al. | |
| 2013/0177309 A1 | 7/2013 | El-Ahmadi et al. | |
| 2013/0179622 A1 | 7/2013 | Pratt et al. | |
| 2013/0194005 A1 | 8/2013 | Vouilainen et al. | |
| 2014/0019662 A1 | 1/2014 | Coffey | |
| 2014/0036920 A1 | 2/2014 | McCormick et al. | |
| 2014/0270634 A1 | 9/2014 | Miller | |
| 2014/0270762 A1 | 9/2014 | Li et al. | |
| 2014/0317249 A1 | 10/2014 | Janakiraman et al. | |
| 2016/0192044 A1 | 6/2016 | Raza | |
| 2018/0059326 A1 | 3/2018 | Makrides-Saravanos | |

FOREIGN PATENT DOCUMENTS

| | | |
|---|---|---|
| WO | 2013171042 | 11/2013 |
| WO | 2016054028 | 6/2016 |

OTHER PUBLICATIONS

International Search Report and Written Opinion mailed in PCT/US2015/039045 by ISA/US dated Oct. 2, 2015.
International Search Report and Written Opinion mailed in PCT/US2015/23077 by ISA/US dated Jul. 7, 2015.
International Search Report and Written Opinion mailed in PCT/US2015/12795 by ISA/US dated May 18, 2015.
International Search Report and Written Opinion mailed in PCT/US2016/026714 by ISA/US dated Jul. 12, 2016.
International Search Report and Written Opinion mailed in PCT/US2015/052924 by ISA/US dated Feb. 2, 2016.
International Search Report and Written Opinion mailed in PCT/US2015/052847 by ISA/US dated Jun. 30, 2016.
International Search Report and Written Opinion mailed in PCT/US2017/051635 by ISA/US dated Nov. 28, 2017.
International Preliminary Report on Patentability mailed in PCT/US2017/051635 by ISA/US dated Mar. 28, 2019.
Examination Report No. 1 in corresponding AU 2017325838 dated Dec. 9, 2019.
Examination Report No. 2 in corresponding AU 2017325838 dated Jun. 15, 2020.
Extended European Search Report in corresponding EU 17851554.0 dated Mar. 20, 2020.

* cited by examiner

INTELLIGENT FIBER PORT MANAGEMENT

CROSS-REFERENCE TO RELATED APPLICATIONS

This application is a continuation application of co-pending and allowed U.S. application Ser. No. 16/288,389 filed Feb. 28, 2019, which is a continuation application of U.S. application Ser. No. 15/705,084 filed Sep. 14, 2017, now U.S. Pat. No. 10,255,628, which is based on and claims benefit from U.S. Provisional Application No. 62/394,544, filed on Sep. 14, 2016, entitled "Intelligent Fiber Port Management," the entire contents of all are incorporated herein in their entirety by reference.

BACKGROUND

Field

The present disclosure relates generally to intelligent systems that map optical fiber communication paths of one port density to optical fiber communication paths of a different port density while providing human perceivable indications to represent attached devices port status, to provide guidance for fiber moves, adds or changes, or for other end user intentions. Other intelligent functions of the system may include an ability to detect cable presence, logging of moves, adds and changes such as counters for cable insertions and extractions, and to identify and log cable characteristics such as color, length, ID, fiber type and such.

SUMMARY

The Intelligent Fiber Port Management System according to the present disclosure maps optical fiber communication paths of one density to optical fiber communication paths of a different density, for either breakout or aggregation functionality. For example, devices with one or more Quad Small Form-factor Pluggable (QSFP+) multi-fiber transceivers that interface with multi-fiber connectors can be mapped to devices with a plurality of small form factor (SFF) transceivers that interface with single fiber optic connectors. Examples of multi-fiber connectors may include but are not limited to Multi-fiber Push On ("MPO") connectors, and examples of single fiber optic connectors may include but are not limited to Lucent Connectors ("LC").

In an example where 20 QSFP+ MPO multi-fiber connections are to be mapped to LC single duplex fiber connections, each QSFP+ transceiver has 4 transmit (Tx) and 4 receive (Rx) fiber paths housed inside a 12 fiber MPO connector that are accessible from, for example, a rear panel of the Intelligent Fiber Port Management System. It should be noted that in this example, the remaining 4 fibers are inactive. The Fiber Port Management System internally provides the required breakout connectivity from the multi-fiber connections to the single fiber connectors. The result in this example is that 20 MPO connectors on a rear panel of the Fiber Port Management System can be mapped to 160 LC connectors on the front panel of the Fiber Port Management System with 80 paired ports.

In another example, a high density multifiber connection such as a 24 fiber MPO connector may break out the individual fibers to single fiber connectors such as bidirectional LC connections or into duplex LC connections supporting a Transmit fiber and a Receive fiber.

In another example, a high density multifiber connection such as a 24 fiber MPO connector may break out the individual fibers to multifiber connectors such as 12 fiber MPO connectors or 8 fiber MPO connectors which may connect to downstream devices with multifiber port connectors such as 12 fiber MPO connectors or other transceiver interfaces such as QSFP transceivers.

In addition, each multi-fiber connector on the Fiber Port Management System, e.g., each MPO connector, has one or more associated LEDs on either the front panel or the rear panel that is in close proximity to the relevant multi-fiber connector and that provides a visual indication programmable by an externally attached device, by an external Management System, or by any other criteria defined by an internal CPU. In the configuration shown, the one or more LEDs can be positioned above the multi-fiber connector. Each single fiber connector on the Fiber Port Management System, e.g., each quad LC connector, has one or more (e.g., two) LEDs on either the front panel or the rear panel that is in close proximity to the relevant single-fiber connector and that provides a visual indication programmable by an externally attached device, by an external Management System, or by any other criteria defined by the internal CPU. The one or more LEDs can have different colors to indicate defined conditions. The colors for the multi-fiber LEDs may be the same as the colors for the single-fiber LEDs or the colors for the multi-fiber LEDs may be different than the colors for the single-fiber LEDs.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The Fiber Port Management System 10 according to the present disclosure can be used to map optical fiber paths of one or more ports of, for example, a network device 50 having one fiber density to optical fiber paths having a different fiber density that can be used by one or more network appliances 60 or other network devices. For the purpose of the present disclosure, a network device can include network switches, patch panels, and other types of devices facilitating data center or network communications. The phrase network appliance can include, for example, data storage devices, servers and other computing devices that facilitate user interaction.

Figure 1:
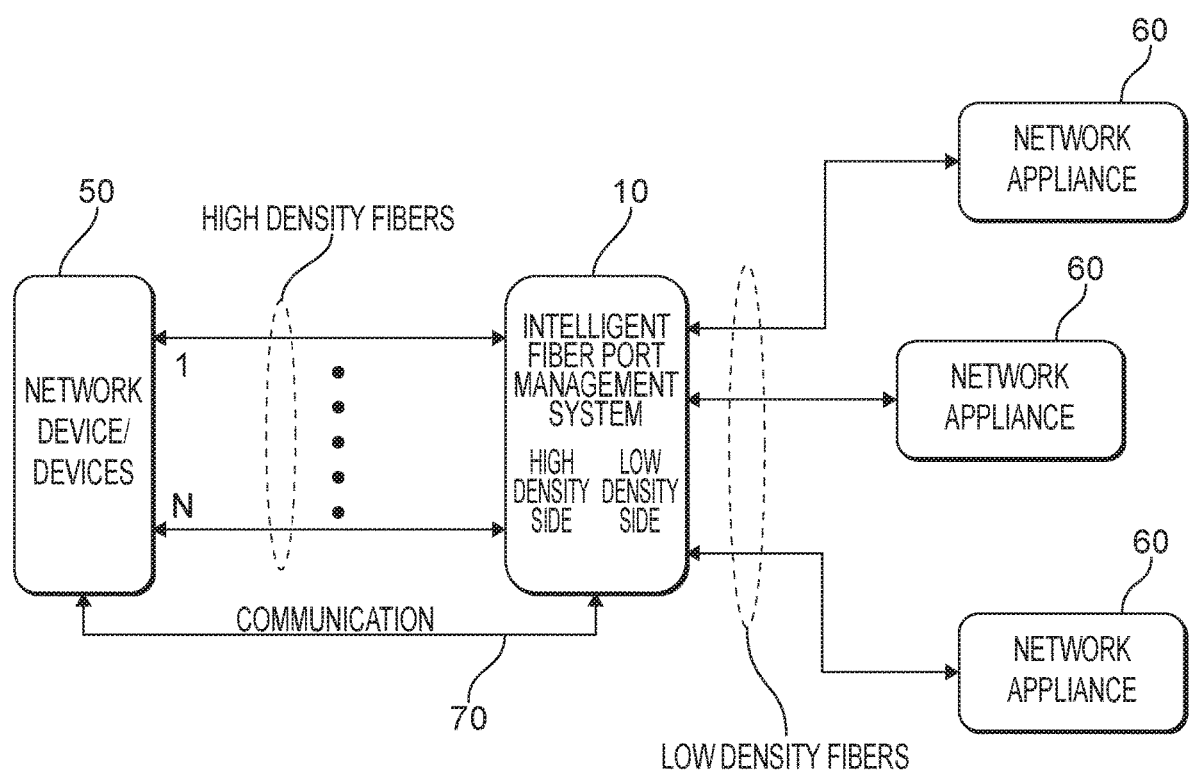
FIG. 1 is a block diagram of an exemplary embodiment of a networking system that includes a fiber port management system according to the present disclosure.

For example, and referring to FIG. 1, the Fiber Port Management System 10 according to the present disclosure can include a high port density side with one or more multi-fiber connectors and a low density side with one or more single or multi-fiber connectors. The high density side can be connected to one or more multi-fiber connectors of for example a network device 50 while the low density side can be connected to one or more network appliances 60. In this example, the network device is a network switch having one or more Quad Small Form-factor Pluggable (QSFP+) multi-fiber transceivers that interface with multi-fiber connectors, and the network appliances 60 are servers with small form factor (SFF) transceivers that interface with single fiber connectors. Using the Fiber Port Management System 10, the high density communication paths on the network device 50 can be mapped to a plurality of low density communication paths connected to a plurality of network appliances 60. Examples of multi-fiber connectors may include Multi-fiber Push On ("MPO") connectors, MXC connectors, or other connectors capable of trunking more than one fiber in a single jacket. Examples of single fiber optic connectors may include Lucent ("LC") connectors, SC connectors, FC/PC connectors, or other connector types that terminate single fiber cable. As noted, the Fiber Port Management System 10 includes one or more LEDs in close proximity to each multi-fiber connector and each single fiber connector that provide pre-defined visual indications. The Fiber Port Management System 10 includes a CPU that is in communication with the network device 50 via the bidirectional communication path 70. The CPU controls the operation of the LEDs in the Fiber Port Management System based any criteria defined by the attached network device 50.

As another example, and referring to FIG. 1, the CPU of the Fiber Port Management System 10 either queries or receives an unsolicited event from the attached network device or plurality of network devices 50 via path 70, representing the port status of the attached network device or plurality of network devices, then maps the status to a pre-defined LED color and or blink pattern.

Figure 2:
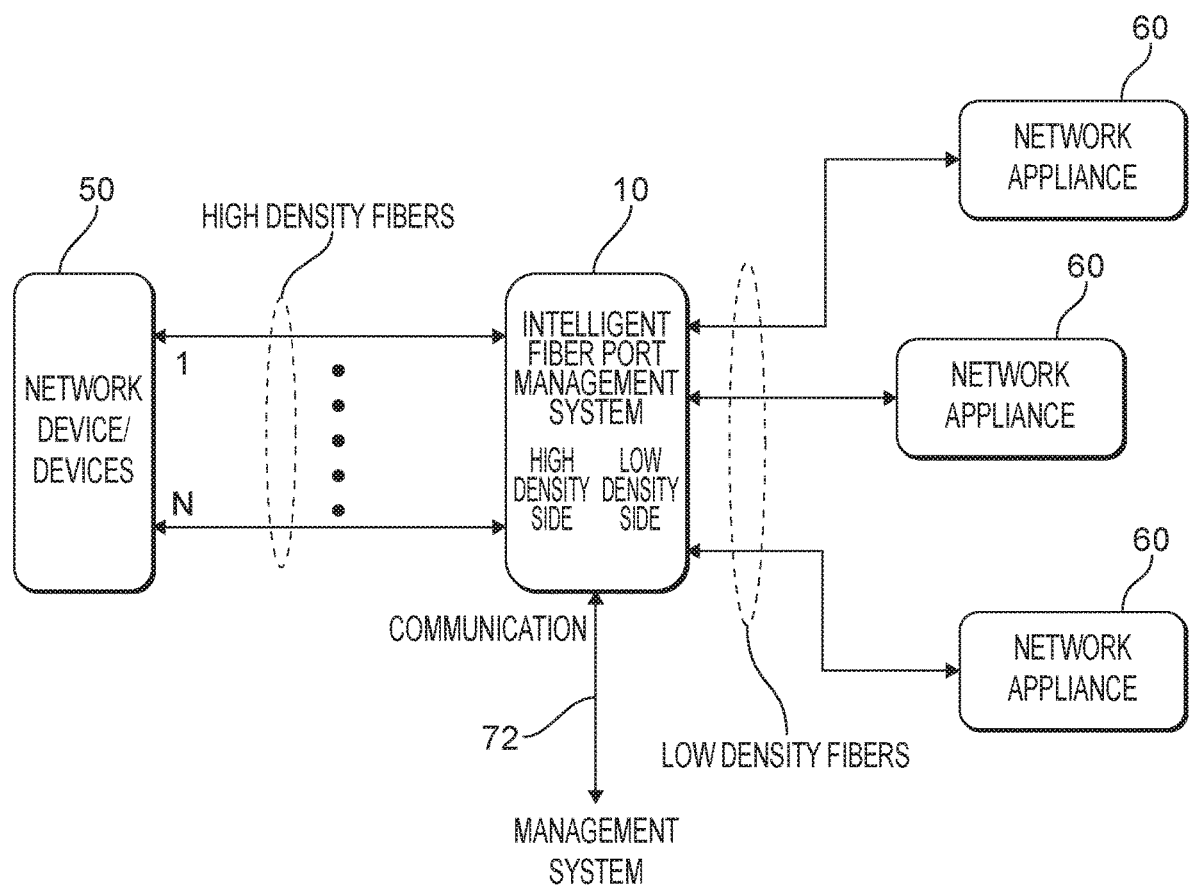
FIG. 2 is a block diagram of another exemplary embodiment of a networking system that includes a fiber port management system according to the present disclosure.
Figure 3:
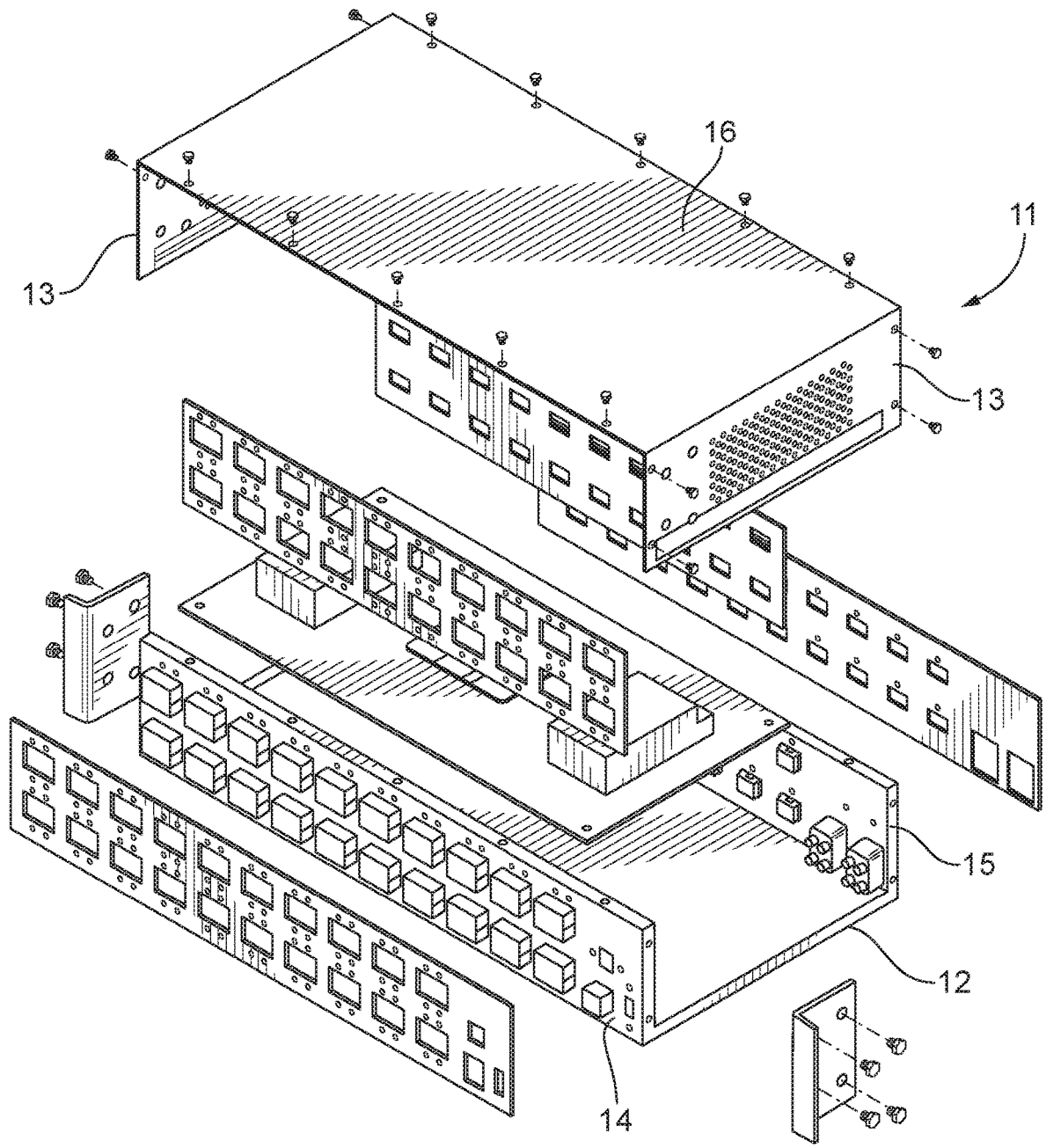
FIG. 3 is a top perspective view with parts separated of an exemplary embodiment of the fiber port management system according to the present disclosure.

As another example, and referring to FIG. 2, the Fiber Port Management System 10 includes a high port density side with one or more multi-fiber connectors and a low density side with one or more single fiber connectors. The high density side can be connected to one or more multi-fiber connectors of for example a network device 50 while the low density side can be connected to one or more network appliances 60. This example is similar to the embodiment of FIG. 1, except the CPU is in communication with an external management system via the bidirectional communication path 72. The external management system determines the behavior of the Fiber Port Management System's LEDs.

Referring to FIGS. 3-7, an exemplary housing for the Fiber Port Management System 10 of the present disclosure is shown. The housing 11 includes, for example, a base 12, side walls 13, a front panel 14, a rear panel 15 and a cover 16. The front and rear panels 14 and 15 of the housing 11 have a printed circuit board (PCB) secured thereto that has electronic components to drive the LEDs on the interior side and LEDs on the exterior side projecting through holes in the front panel 14 and the rear panel 15. Each LED is visible from an exterior of the housing 11 to permit visibility of the LED.

Figure 8:
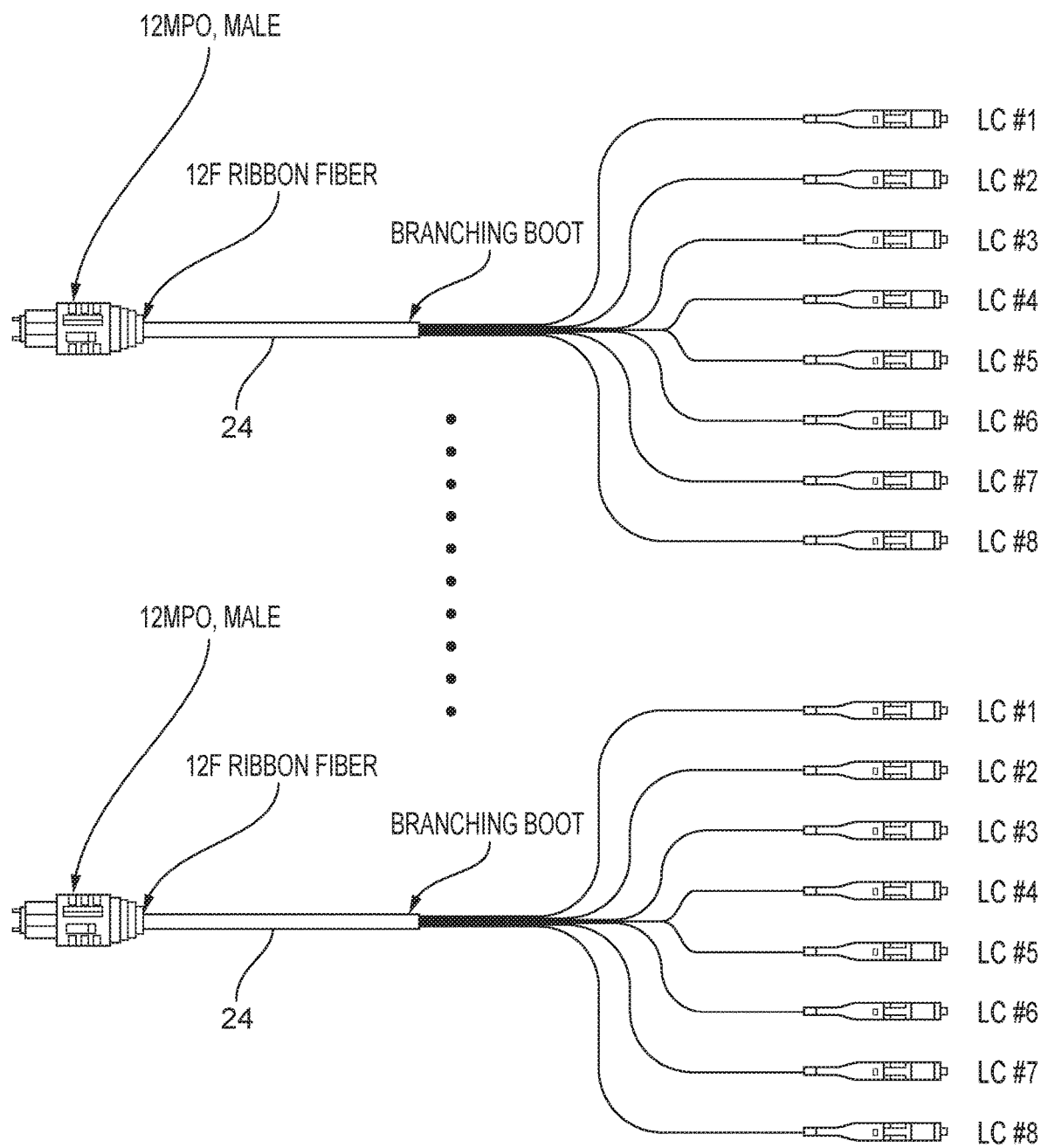
FIG. 8 is a plan view of a number of hydra cables used to connect connectors on the rear panel to connectors on the front panel of the fiber port management system of FIG. 3.

For the high density side of the Fiber Port Management System 10, the one or more multi-fiber connectors 20 can be connected to, for example, the front or rear panel of the housing 11, and for the low density side of the Fiber Port Management System 10, one or more single-fiber connectors 22 can be connected to, for example, the front or rear panel of the housing 11. An exemplary MPO to LC hydra cable 24, seen in FIG. 8, within the housing 11 splits or converts the fiber connections from the multi-fiber connectors to the single fiber connectors. For example, the hydra cable can split a 4×10 Gbps QSFP transceiver to four duplex SFP transceivers. The QSFP transceiver is connected to the rear chassis MPO connector by a straight 12 fiber MPO cable with MTP connectors. The multi-fiber cable can mate to the rear MPO connector in a key up position on the rear panel 15 of the housing 11 and key down position on the inside of the housing 11. The low density side of the hydra cables, e.g., LC #1-LC #8, is inserted into the LC connectors on, for example, the front panel 14 of the housing 11.

Figure 5:
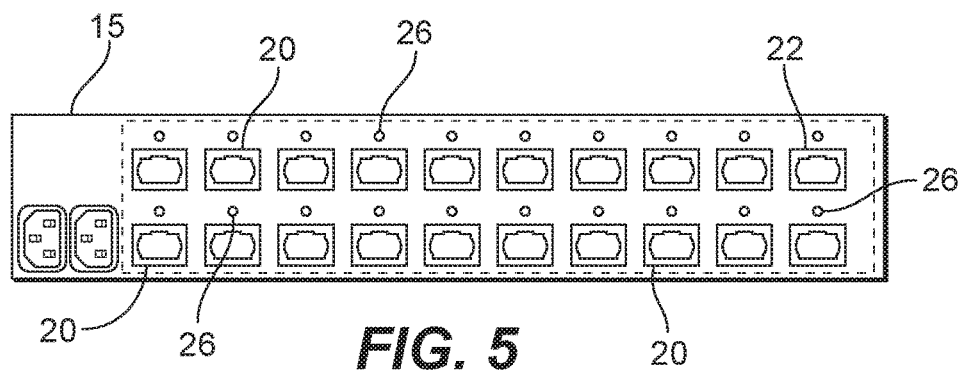
FIG. 5 is a plan view of an exemplary embodiment of a rear panel of the fiber port management system of FIG. 3.
Figure 6:
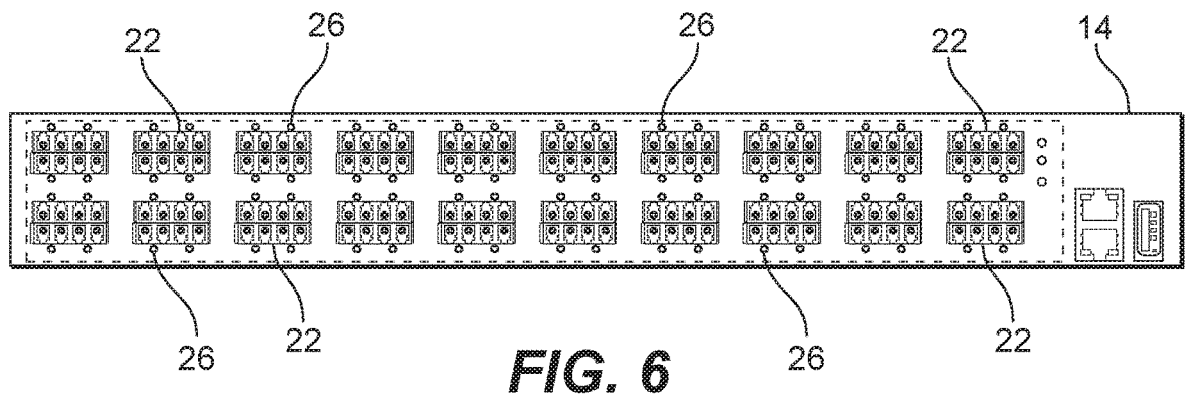
FIG. 6 is a plan view of an exemplary embodiment of a front panel of the fiber port management system of FIG. 3.
Figure 7:
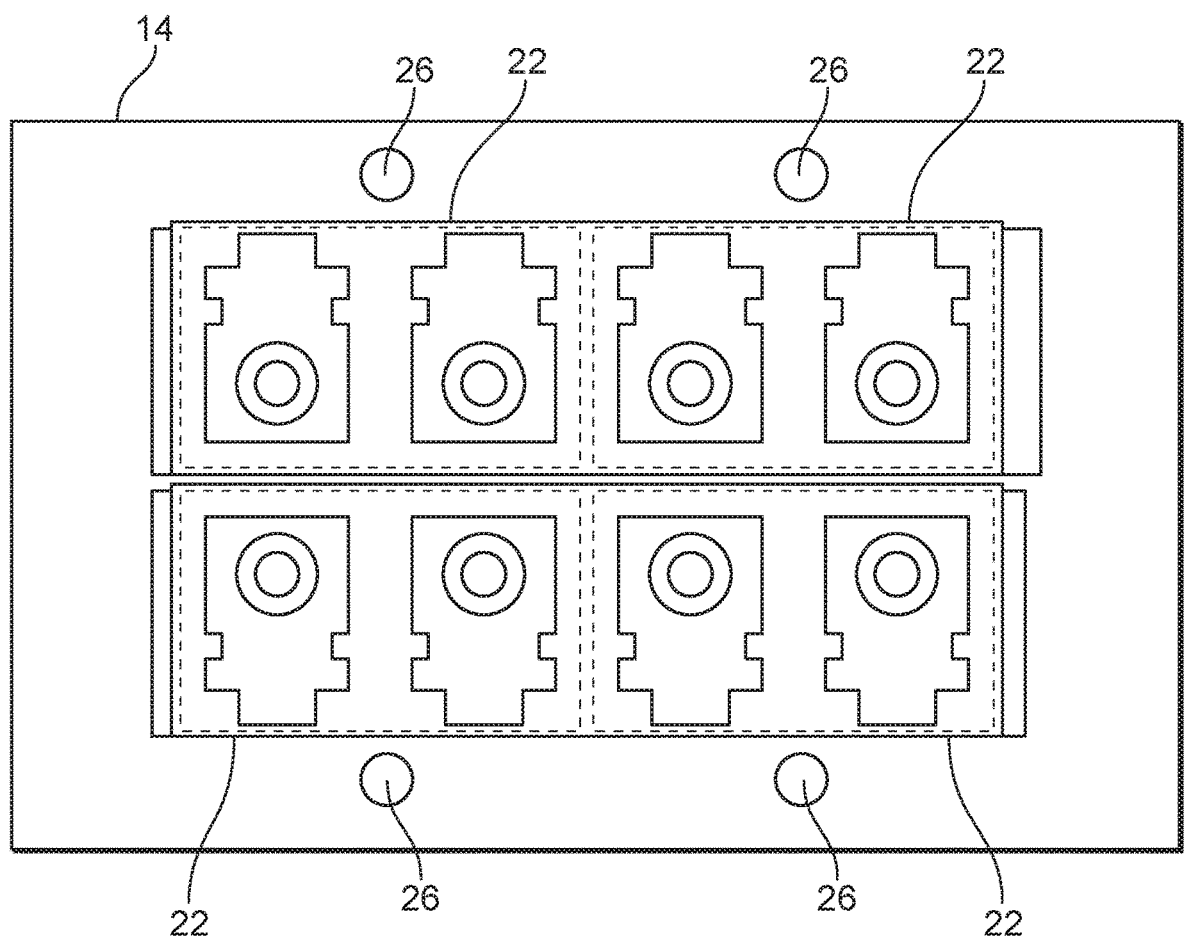
FIG. 7 is an enlarged plan view of a portion of the front panel of FIG. 6.

The Multi-fiber Termination Push-on ("MTP") connectors, which are also called MPO connectors 20, and LC connectors 22 are mounted to openings in the PCB on the front and/or rear panels 14 and 15. Other embodiments may include higher density MPO connectors on the rear panel and lower density MPO connectors on the front panel. The LC connectors or adapters pass through openings on the PCB and mount to, for example, the front panel 14 of the housing 11, and may or may not be operatively connected to the PCB. As shown in FIGS. 6 and 7, the LC connectors 22 are arranged in this exemplary embodiment as 20 LC groups with two quad LC connectors per group. Each group has two LEDs 26 above and two LEDs 26 below the LC connectors 22. As seen in FIG. 5, the rear panel 15 of the housing 11 in the embodiment shown supports two AC input connectors, 20 MPO panel mount connectors 20, and a PCB mounted flush with the inside of the rear panel 15. The MPO connectors pass through openings on the PCB and mount to, for example, the rear panel 15 of the housing 11, and may or may not be operatively connected to the PCB attached to the rear panel 15. In other embodiments, the MPO connectors may be mounted to the PCB. The MPO connectors in this embodiment are configured as two rows with 10 MPO connectors 20 per row, as shown in FIG. 5. In addition, each MPO connector has a port status LED 26 above the MPO connector 20, as seen in FIG. 5.

In the exemplary configuration shown in FIG. 6, the front panel 14 of the housing 11 can include an RJ 45 jack Ethernet port, an RJ 45 jack Craft port, a USB connector port, 40 Quad LC panel mount connectors 22, port status LEDs 26, a power supply 1 status LED, a power supply 2 status LED and a CPU status LED. The front panel 14 may also include a recessed reset switch. The LEDs and reset switch are mounted to the front panel PCB which in turn is mounted flush with the inside of the front panel 14 of the housing 11. The port status LEDs 26 are associated with a particular port of the high density side or low density side of the fiber port aggregator 10.

Figure 4:
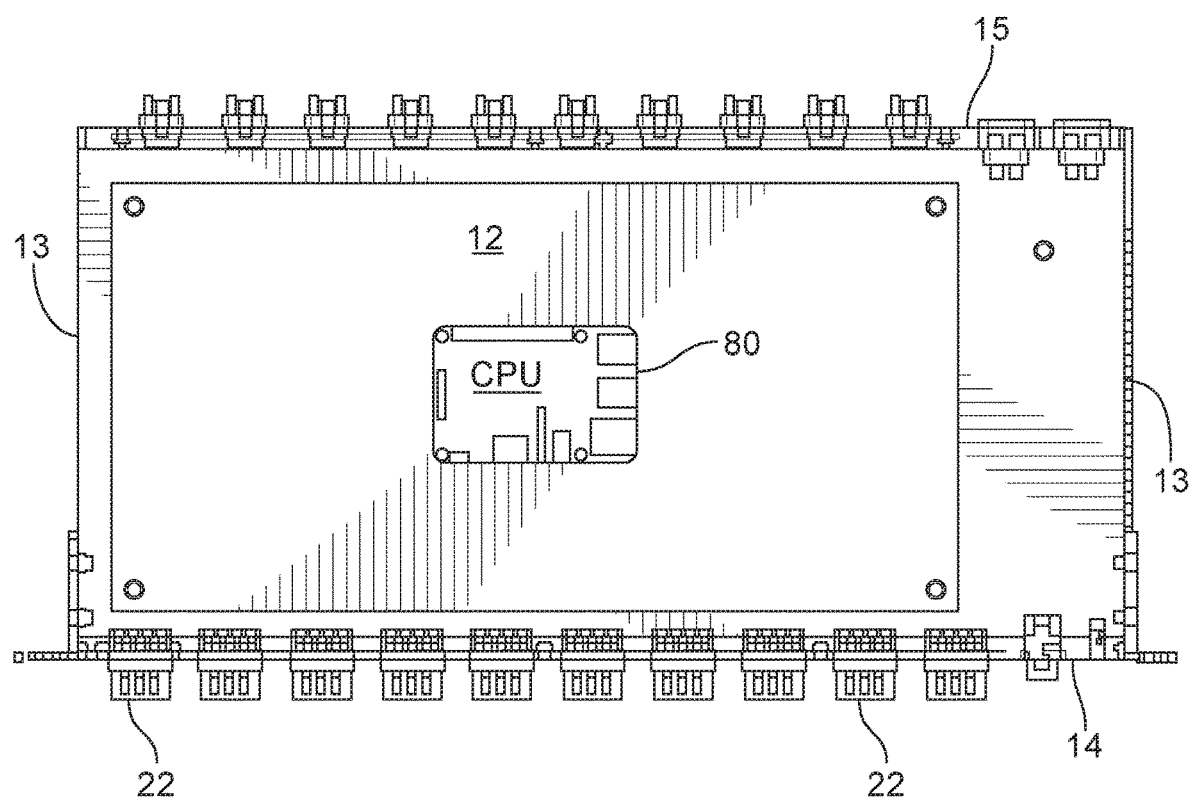
FIG. 4 is top plan view of the fiber port management system of FIG. 3 with a cover removed.
Figure 9:
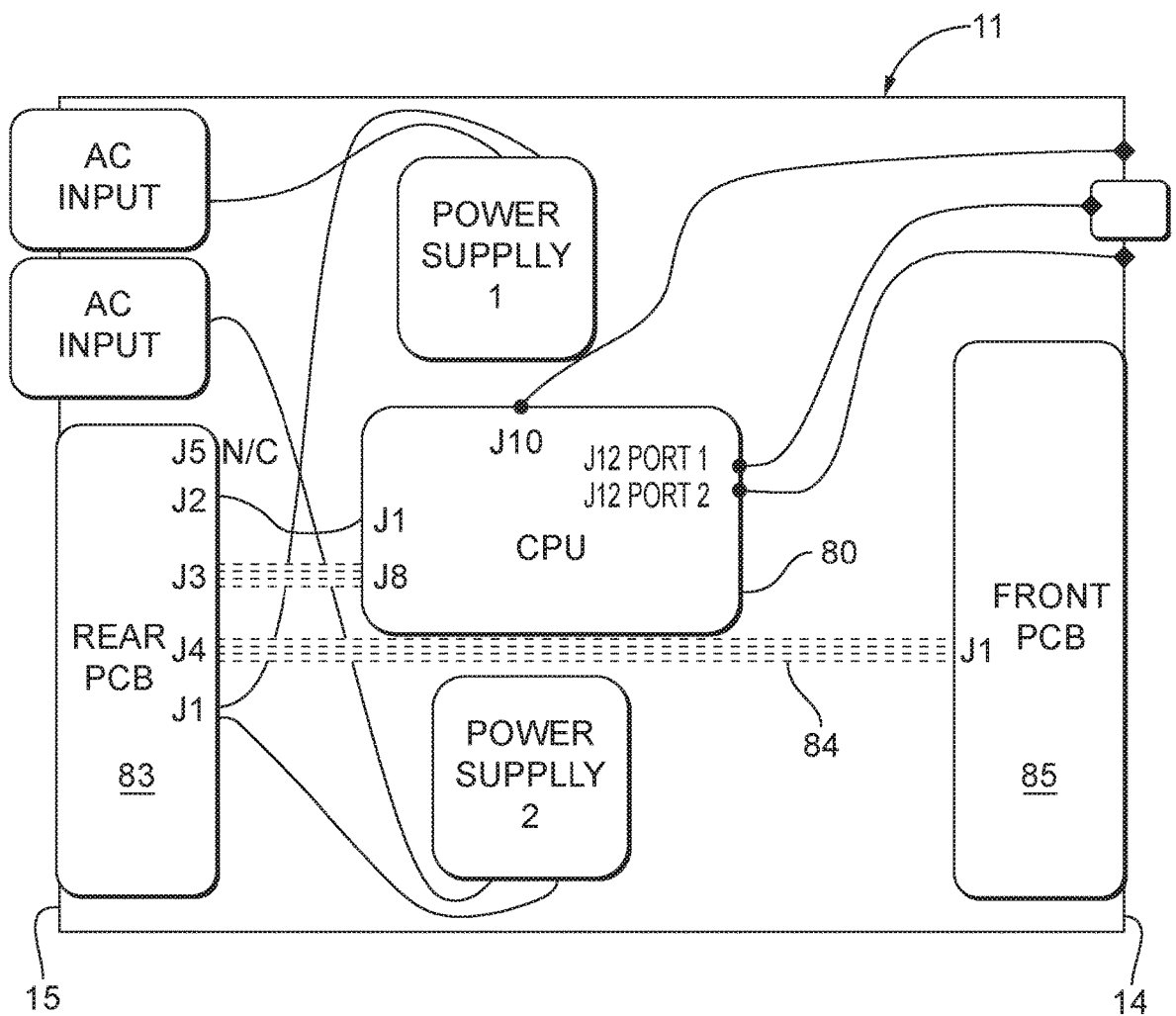
FIG. 9 is a block diagram of an exemplary embodiment of a controller incorporated into the fiber port management system of FIG. 3.
Figure 10:
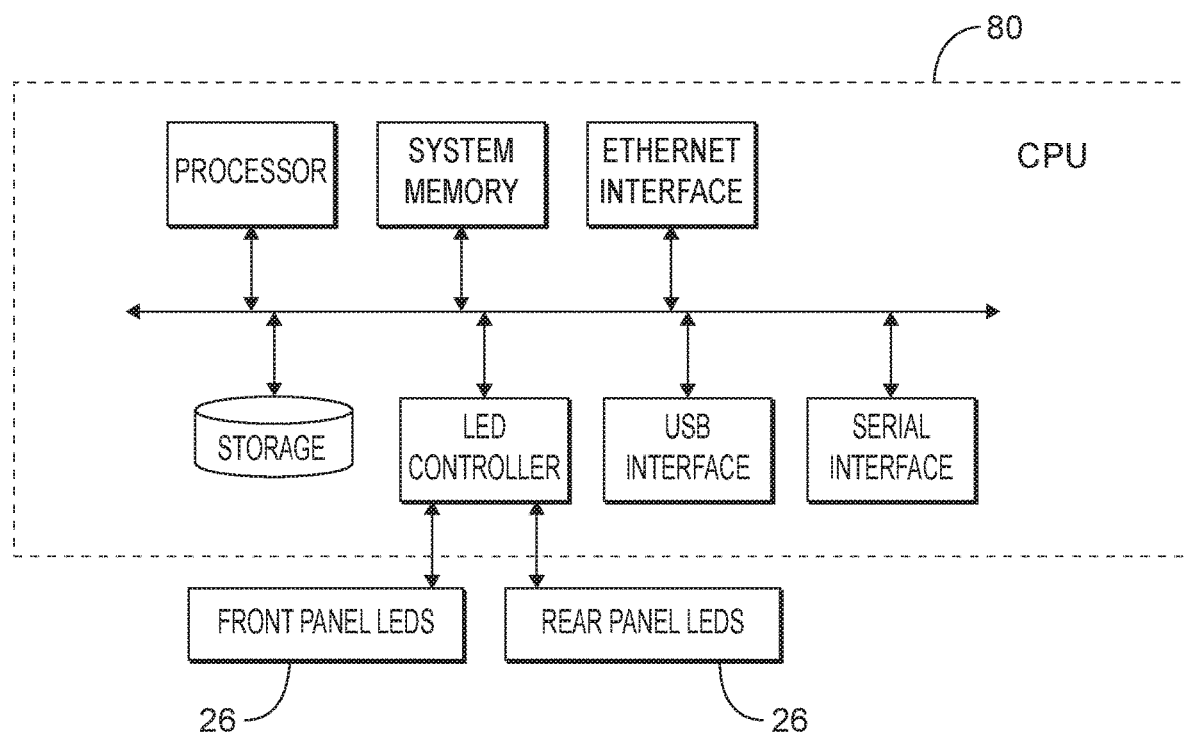
FIG. 10 is a block diagram of an exemplary embodiment of a processor within the controller of FIG. 9.

Within the housing 11 is a CPU 80, seen in FIG. 4, and power supplies that provide power to the CPU. Referring to FIGS. 9 and 10, a wiring diagram of the CPU used to control the LEDs 26 is shown. As noted above, the LEDs 26 are mounted to PCBs attached to the front and rear panels of the housing 11. The CPU 80 has a ribbon cable 82 connected to the PCB 83 on the rear panel 15 of the housing 11. A ribbon cable 84 also connects between the PCB 85 attached to the front panel 14 of the housing 11 and the PCB 83 attached to the rear panel 15 of the housing 11. The AC power cable is connected between each AC power inlet to the line and neutral lugs on each power supply. The RJ 45 jack Ethernet port, RJ 45 jack Craft port, and USB connector port are connected to the CPU 80.

Fiber Port Management System CPU Operation

The Fiber Port Management System 10 frontends a network device (e.g., network device 50) and extends the aggregated interfaces to low density or lower density pairs of ports, e.g., simplex pairs of ports. A function of the Fiber Port Management System 10 is to split or breakout the aggregated data to individual ports. The Fiber Port Management System 10 has a core processor environment (CPE) with LED indicators 26 for each port. The CPE can reside on the Fiber Port Management System 10 or remotely on a different platform. The CPE manages an application program interface.

1. Network Device Controlling Fiber Port Management System

A network device that includes any platform with software or hardware able to communicate to Fiber Port Management System 10 via a defined application program interface (API) can be used with the Fiber Port Management System of the present disclosure. In this exemplary embodiment, the API can include any method of communicating to the Fiber Port Management System. For example, a Restful API, JSON format can be used to communicate with the Fiber Port Management System 10. In this exemplary embodiment, the network device 50 is the master and controls and/or provides information to the Fiber Port Management System 10 acting as a slave device. An example of the communication protocol may include:

Step 1. Start API
Step 2. Wait to receive command from controlling network device
Step 3. If network device Status/Information is requested
   a. Handle request by reporting status/information regarding the Fiber Port Management System, e.g., the Fiber Port Management System ID, the hardware version, the software revision, etc. A response to the request can also include environment status such as power supply status, or temperature status, etc.
   b. Return to Step 2
Step 4. If Port/Interface control is requested
   a. Set port status LED to specified state. The state can include color, mode (blinking and rate of blink) etc.
   b. Save any configuration changes to database.
   c. Return to Step 2
Step 5. If port status LED status is requested
   a. Report back last LED state
   b. Return to Step 2

2. Fiber Port Management System Association to Network Device Interfaces

A network device 50 that includes any platform with software or hardware able to communicate to the Fiber Port Management System via defined Application Program Interface (API) can be used with the Fiber Port Management System 10 of the present disclosure. In this exemplary embodiment, the API can include any method of communicating between the Fiber Port Management System 10 and the network device 50. In this exemplary embodiment, the Fiber Port Management System 10 is the master and polls the network device 50 for information to determine the state of the port status of the LEDs 26. The information is then parsed by the Fiber Port Management System 10 to set the state, e.g., the color, mode, etc., of each LED 26 associated with the high density connectors 20 and/or the low density connectors 22. Two processes would be used to parse the information; configuration and interface polling. An example of the communication protocol may include:

Process #1, Configuration.
Step 1. Start Configuration API
Step 2. Wait to receive command
Step 3. If Device Status/Information is requested
   a. Handle request by reporting status/information, such as the Fiber Port Management System ID, the hardware version, the software revision, etc. A response can also be an environment status, such as power supply, temperature, etc.
   b. Return to Step 2
Step 4. If Configure Device IP address and communication method is requested
   a. Configure IP of Device and communication method.
   b. When configured, access device and get Interface information then create entries in database for each interface.
   c. Return to Step 2
Step 5. If Associate FPA port to Device interface is requested
   a. Get Device's interface information from database.
   b. Configure FPA's port on Device's interface entry.
   c. Return to Step 2
Step 6. If set POLL time requested
   a. Set POLL time, Process #2, Interface Polling.
Step 1. Start Interfaces poll
Step 2. Wait for POLL time to elapse
Step 3. Poll all network devices using specific communication method for that network device.
Step 4. Update Fiber Port Management System's database then control the LEDs based on received information. The LEDs can be set to a color and mode based on predefined criteria.

For example:
   a. If Interface is 'Administratively and Operationally up' then turn it's corresponding LED to 'Solid Green'
   b. If Interface is 'Administratively up' but 'Operationally down' then turn it's corresponding LED 'off'
   c. If Interface has an 'Alarm' then turn it's corresponding LED 'fast blinking Red'

3. Fiber Port Management System Virtual Display

A network device that includes any platform with software or hardware able to communicate to Fiber Port Management System via defined Application Program Interface (API) can be used with the Fiber Port Management System of the present disclosure. In this exemplary embodiment, the API can be any method of communicating between the Fiber Port Management System 10 and the network device 50. The Fiber Port Management System 10 can be either a slave device or a master device such that information used to set the state of the LEDs 26 is set by a network device 50 or polled/received by the Fiber Port Management System. This embodiment uses methods for receiving request/information about interface, as described in sections 1 or 2 above. In this exemplary embodiment, the Fiber Port Management System's CPE is in another platform, i.e. an appliance or virtual machine. The CPE shows a virtual display of the Fiber Port Management System and its LEDs. The virtual display can be on any network device 50 or appliance 60, local to CPE or on a mobile device.

As will be appreciated by one skilled in the art, aspects of the present disclosure may be embodied as a system, method or computer program. Accordingly, aspects of the present invention may take the form of an entirely hardware embodiment, an entirely software embodiment (including firmware, resident software, micro-code, etc.) or an embodiment combining software and hardware aspects that may all generally be referred to herein as a system. Furthermore, aspects of the present disclosure may take the form of a computer program product embodied in one or more computer readable medium(s) having computer readable program code embodied thereon.

Computer program code for carrying out operations for aspects of the present invention may be written in any combination of one or more programming languages, including an object oriented programming language such as Java, Smalltalk, C++ or the like, and conventional procedural programming languages, such as the "C" programming language or similar programming languages.

The computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

It will be understood that various modifications can be made to the embodiments of the present disclosure without departing from the spirit and scope thereof. Therefore, the above description should not be construed as limiting the disclosure, but merely as embodiments thereof. Those skilled in the art will envision other modifications within the scope and spirit of the invention as defined by the claims appended hereto.

What is claimed is:

1. A fiber port management system comprising:
   a plurality of low density fiber connectors arranged as paired fiber connectors and a plurality of high density fiber connectors;
   a plurality of hydra cables, each hydra cable connecting one of the plurality of high density fiber connectors to at least one of the paired fiber connectors;
   at least one indicator associated with each of the paired fiber connectors;
   at least one indicator associated with each of the plurality of high density fiber connectors; and
   a controller used to control the operation of the at least one indicator associated with each paired fiber connector based upon a status associated with the paired fiber connectors, and to control the operation of the at least one indicator associated with each of the plurality of high density fiber connectors based upon a status associated with the plurality of high density fiber connectors.

2. The fiber port management system according to claim 1, wherein the plurality of low density fiber connectors comprise single fiber connectors.

3. The fiber port management system according to claim 2, wherein the single fiber connectors comprise one of LC, SC or FC/PC connectors.

4. The fiber port management system according to claim 1, wherein the plurality of high density fiber connectors comprise multi-fiber connectors.

5. The fiber port management system according to claim 4, wherein the multi-fiber connectors comprise one of MPO, MXC or MTP connectors.

6. The fiber port management system according to claim 1, wherein the at least one indicator associated with each paired fiber connectors comprises an LED.

7. The fiber port management system according to claim 1, wherein the at least one indicator associated with each of the plurality of high density fiber connectors comprises an LED.

8. A fiber port management system comprising:
   a plurality of low density fiber connectors and a plurality of high density fiber connectors;
   a plurality of hydra cables, each hydra cable connecting one of the plurality of high density fiber connectors to at least one of the plurality of low density fiber connectors, wherein each of the plurality of low density fiber connectors include connectors having a density that is less than the density of the plurality of high density fiber connectors;
   at least one indicator associated with each of the plurality of low density fiber connectors;
   at least one indicator associated with each of the plurality of high density fiber connectors; and
   a controller used to control the operation of the at least one indicator associated with each of the plurality of low density fiber connectors based upon a status associated with the plurality of low density fiber connectors, and to control the operation of the at least one indicator associated with each of the plurality of high density fiber connectors based upon a status associated with the plurality of high density fiber connectors.

9. A fiber port management system comprising:
   a plurality of low density fiber connectors;
   a plurality of high density fiber connectors;
   at least one cable splitter connected to one of the plurality of high density fiber connectors and to at least two of the plurality of low density fiber connectors, wherein the at least two of the plurality of low density fiber connectors are arranged as paired fiber connectors;
   at least one indicator associated with each of the paired fiber connectors;
   at least one indicator associated with each of the plurality of high density fiber connectors; and
   a controller used to control the state of the at least one indicator associated with each of the paired fiber connectors based upon a status associated with the paired fiber connectors, and to control the state of the at least one indicator associated with each of the plurality of high density fiber connectors based upon a status associated with the plurality of high density fiber connectors, wherein the state of at least one indicator associated with the paired fiber connectors includes one of an on-state, an off-state and an alarm state, and wherein the state of at least one indicator associated with each of the plurality of high density fiber connectors includes one of an on-state, an-off state and an alarm state.

10. The fiber port management system according to claim 9, wherein the plurality of low density fiber connectors comprise single fiber connectors.

11. The fiber port management system according to claim 10, wherein the single fiber connectors comprise one of LC, SC or FC/PC connectors.

12. The fiber port management system according to claim 9, wherein the plurality of high density fiber connectors comprise multi-fiber connectors.

13. The fiber port management system according to claim 12, wherein the multi-fiber connectors comprise one of MPO, MXC or MTP connectors.

14. The fiber port management system according to claim 9, wherein the at least one indicator associated with each of the plurality of low density fiber connectors comprises an LED.

15. The fiber port management system according to claim 9, wherein the at least one indicator associated with each of the plurality of high density fiber connectors comprises an LED.

* * * * *